(12) United States Patent
Renzo et al.

(10) Patent No.: US 12,180,988 B2
(45) Date of Patent: Dec. 31, 2024

(54) INTEGRAL RETENTION CLIP WITH NUT

(71) Applicant: GM GLOBAL TECHNOLOGY OPERATIONS LLC, Detroit, MI (US)

(72) Inventors: Joshua Leonard Renzo, Clarkston, MI (US); Ronald C Daul, Northville, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 210 days.

(21) Appl. No.: 17/809,975

(22) Filed: Jun. 30, 2022

(65) Prior Publication Data
US 2024/0003366 A1    Jan. 4, 2024

(51) Int. Cl.
F16B 37/04   (2006.01)
F16B 2/06    (2006.01)

(52) U.S. Cl.
CPC ............ *F16B 2/065* (2013.01); *F16B 37/043* (2013.01)

(58) Field of Classification Search
CPC ....... F16B 37/02; F16B 37/041; F16B 37/043
USPC ................................... 411/174, 175
See application file for complete search history.

(56) References Cited

U.S. PATENT DOCUMENTS

| | | | | | |
|---|---|---|---|---|---|
| 2,101,287 | A | * | 12/1937 | Tinnerman | F16B 37/041 126/39 B |
| RE21,769 | E | * | 4/1941 | Tinnerman | F16B 37/041 411/524 |
| 2,255,469 | A | * | 9/1941 | Kost | F16B 37/041 411/970 |
| 2,323,689 | A | * | 7/1943 | Tinnerman | F16B 37/041 411/970 |
| 2,399,957 | A | * | 5/1946 | Tinnerman | F16B 37/041 411/929 |
| 3,009,499 | A | * | 11/1961 | Weihe | F16B 37/041 29/432 |
| 3,376,612 | A | * | 4/1968 | Munse | F16B 37/043 411/176 |
| 3,999,583 | A | * | 12/1976 | Nelson | F16B 37/041 411/970 |
| 5,707,192 | A | * | 1/1998 | Vortriede | F16B 37/041 411/546 |
| 5,951,223 | A | * | 9/1999 | Lindquist | F16B 37/02 411/104 |
| 9,746,018 | B2 | * | 8/2017 | Williams | F16B 37/041 |
| 11,415,164 | B2 | * | 8/2022 | Stewart | F16B 37/044 |
| 2006/0226312 | A1 | * | 10/2006 | Masuch | F16B 37/041 248/188 |
| 2007/0224018 | A1 | * | 9/2007 | DePerro | F16B 37/043 411/175 |

FOREIGN PATENT DOCUMENTS

| JP | S63115910 U | 7/1988 |
|---|---|---|
| JP | 09229044 A | 2/1997 |

* cited by examiner

*Primary Examiner* — Flemming Saether
(74) *Attorney, Agent, or Firm* — Lorenz & Kopf LLP (57) ABSTRACT

A retention clip includes a first clip arm that defines a fastener bore and includes at least one retention finger that extends into the fastener bore. The retention clip also includes a second clip arm spaced apart from the first clip arm. The second clip arm includes a nut having a bore coaxially aligned with the fastener bore and configured to receive a fastener.

18 Claims, 7 Drawing Sheets

INTEGRAL RETENTION CLIP WITH NUT

INTRODUCTION

The technical field generally relates to fastening systems, and more particularly relates to an integral retention clip with a nut for receiving a mechanical fastener, such as a bolt or screw.

Various components may be assembled to a frame to form a vehicle. Often times, the component is mounted via a mechanical fastener, such as a bolt or screw. In order to fasten certain components, the component has to be held in place by an operator and the mechanical fastener has to be manually started or hand-threaded by the operator to start the coupling of the mechanical fastener to the frame to hold the component and the mechanical fastener into place. Once the mechanical fastener is started by hand-threading and held in place, the operator may then grab a fastening tool, which is used to fully couple the mechanical fastener and the component to the frame. The hand-threading of the mechanical fastener may increase assembly time and may also require additional space between the component and the frame to accommodate the hand-threading of the mechanical fastener.

Accordingly, it is desirable to provide an integral retention clip having a nut, which enables a component to be coupled to a frame of a vehicle with a mechanical fastener without requiring hand-threading of the mechanical fastener. Furthermore, other desirable features and characteristics of the present invention will become apparent from the subsequent detailed description and the appended claims, taken in conjunction with the accompanying drawings and the foregoing technical field and background.

SUMMARY

According to various embodiments, provided is a retention clip. The retention clip includes a first clip arm that defines a fastener bore and includes at least one retention finger that extends into the fastener bore. The retention clip also includes a second clip arm spaced apart from the first clip arm. The second clip arm includes a nut having a bore coaxially aligned with the fastener bore and configured to receive a fastener.

The first clip arm and the second clip arm are coupled together via a bridge, and the first clip arm and the second clip arm are cantilevered relative to the bridge. The first clip arm includes a first arm end opposite a second arm end, the second arm end includes a third arm end opposite a fourth arm end, and the first arm end and the third arm end are coupled together via a bridge. The fourth arm end includes a lip that extends along a lip axis that is transverse to an axis along which the second clip arm extends. The second arm end defines a notch configured to receive a fastening tool. The second clip arm includes a third clip surface opposite a fourth clip surface, the at least one retention finger faces the third clip surface and the nut is defined on the fourth clip surface. The retention at least one retention finger comprises a plurality of retention fingers that are spaced apart about a circumference of the fastener bore. The first clip arm and the second clip arm extend along an axis and the at least one retention finger extends along a retention axis that is transverse to the axis. The bore of the nut has a center axis, and the center axis is perpendicular to the axis. The retention clip is integrally formed. The retention clip is integrally formed from a polymer-based material. The first clip arm is spaced apart from the second clip arm to receive a frame associated with a vehicle, a first clip surface of the first clip arm is configured to contact a component, and the retention clip is configured to couple the component to the frame with the fastener. The at least one retention finger tapers from the fastener bore to a terminal end and the at least one retention finger extends beyond a surface of the first clip arm toward the second clip arm.

Further provided is a retention clip. The retention clip includes a first clip arm that defines a fastener bore and includes a plurality of retention fingers. Each of the plurality of retention fingers extends into the fastener bore and each of the plurality of retention fingers is spaced apart from an adjacent retention finger of the plurality of retention fingers about a circumference of the fastener bore. The retention clip includes a second clip arm spaced apart from the first clip arm. The second clip arm includes a nut having a bore coaxially aligned with the fastener bore and configured to receive a fastener. The retention clip includes a bridge that interconnects the first clip arm and the second clip arm such that the first clip arm and the second clip arm are cantilevered relative to the bridge.

The first clip arm includes a first arm end opposite a second arm end, the second arm end includes a third arm end opposite a fourth arm end, and the first arm end and the third arm end are coupled together via the bridge. The fourth arm end includes a lip that extends along a lip axis that is transverse to an axis along which the second clip arm extends, and the second arm end defines a notch configured to receive a fastening tool. The second clip arm includes a third clip surface opposite a fourth clip surface, the at least one retention finger faces the third clip surface and the nut is defined on the fourth clip surface. The first clip arm and the second clip arm extend along an axis and each of the plurality of retention fingers extends along a retention axis that is transverse to the axis. The bore of the nut has a center axis, and the center axis is perpendicular to the axis. Each of the plurality of retention fingers tapers from the fastener bore to a terminal end and each of the plurality of retention fingers extend beyond a surface of the first clip arm toward the second clip arm.

BRIEF DESCRIPTION OF THE DRAWINGS

The exemplary embodiments will hereinafter be described in conjunction with the following drawing figures, wherein like numerals denote like elements, and wherein.

DETAILED DESCRIPTION

The following detailed description is merely exemplary in nature and is not intended to limit the application and uses.

Furthermore, there is no intention to be bound by any expressed or implied theory presented in the preceding introduction, brief summary or the following detailed description. In addition, those skilled in the art will appreciate that embodiments of the present disclosure may be practiced in conjunction with any number of systems, and that the systems described herein are merely exemplary embodiments of the present disclosure. It should be noted that many alternative or additional functional relationships or physical connections may be present in an embodiment of the present disclosure. As used herein, the term "substantially" denotes within 10% to account for manufacturing tolerances and the term "about" denotes within 10% to account for manufacturing tolerances.

Figure 1:
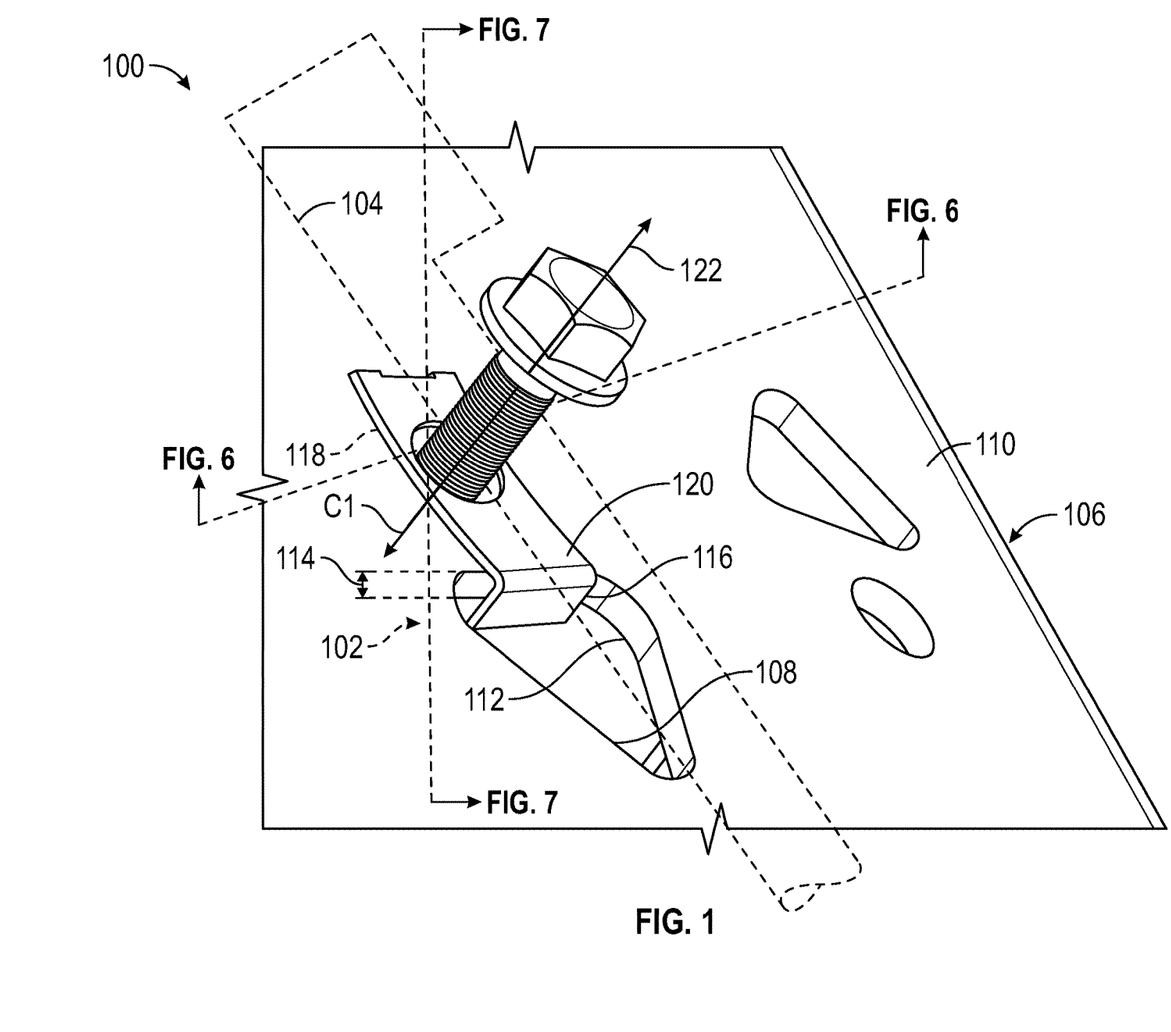
FIG. 1 is a schematic illustration of an integral retention clip with a nut for coupling a component to a frame with a mechanical fastener in accordance with various embodiments.

With reference to FIG. 1, an integral retention clip 100 is shown. The retention clip 100 has a nut 102. In the example of FIG. 1, the retention clip 100 having the nut 102 is used to couple a component 104, such as a fascia, bumper, skid plate, etc. to a frame 106. The frame 106 is a frame associated with a vehicle, such as a passenger car, but it should be appreciated that the retention clip 100 may be used with any other vehicle, including motorcycles, trucks, sport utility vehicles (SUVs), recreational vehicles (RVs), marine vessels, aircraft, etc., and moreover, the retention clip 100 may be used to fasten components to other non-vehicle structures, such as in buildings, etc. Generally, the frame 106 includes an opening 108, which is defined through the frame 106 from a first frame side 110 to an opposite second frame side 112. In one example, the frame 106 has a frame thickness 114 defined between the first frame side 110 and the second frame side 112. The shape of the opening 108 shown in FIG. 1 is merely an example, as the opening 108 may have any desired shape, and moreover, while the opening 108 is illustrated herein with a closed perimeter, the retention clip may be coupled to a notch, recess or other open perimeter opening defined through the frame 106 or along an edge of the frame 106. The opening 108 has a sidewall 116 that at least partially defines an inner perimeter of the opening 108. The sidewall 116 receives the retention clip 100. Proximate the sidewall 116 of the opening 108, the frame 106 also defines a frame fastener bore 118. In this example, a central axis Cl of the frame fastener bore 118 is spaced a fastener distance 120 from the sidewall 116.

A fastener or mechanical fastener 122 is received through the component 104, the retention clip 100, the frame fastener bore 118 and into the nut 102 to couple the component 104 to the frame 106. As will be discussed, the retention clip 100 having the nut 102 enables the mechanical fastener 122 to be held by the retention clip 100, thereby holding the component 104 to the frame 106, which enables the operator to use a fastening tool, such as a drill, to drive the mechanical fastener 122 into engagement with the nut 102 to couple the component 104 to the frame 106. Stated another way, the retention clip 100 couples the component 104 and the mechanical fastener 122 to the frame 106 to enable the operator to use the fastening tool to couple the mechanical fastener 122 to the nut 102 and secure the component 104 to the frame 106 without hand-threading the mechanical fastener 122 into engagement with the frame 106. Thus, the retention clip 100 reduces assembly time and reduces an amount of clearance required for the assembly of the component 104 to the frame 106.

Figure 2:
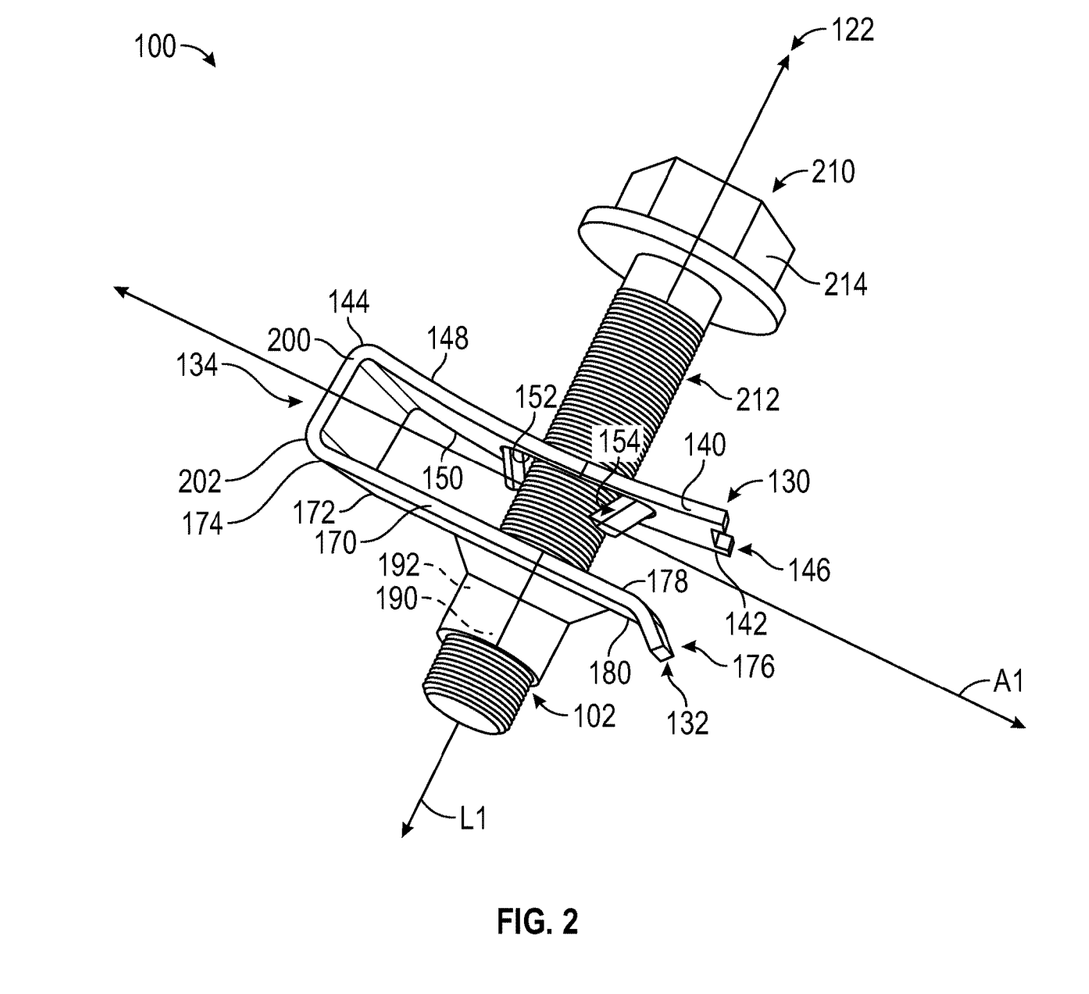
FIG. 2 is a perspective view of the retention clip with the nut of FIG. 1, which includes the mechanical fastener.

With reference to FIG. 2, the retention clip 100 and the nut 102 are shown with the mechanical fastener 122 uncoupled from the frame 106. The retention clip 100, the nut 102 and the mechanical fastener 122 cooperate to form a fastening system that couples the component 104 to the frame 106 (FIG. 1). The retention clip 100 and the nut 102 are formed as one-piece, or are monolithic. The retention clip 100 and the nut 102 may be composed of metal or metal alloy, and may be cast, forged, stamped, additively manufactured, etc. For example, the retention clip 100 and the nut 102 may be composed of steel, aluminum, etc. When composed of a metal or metal alloy, such as steel, aluminum and the like, the retention clip 100 and the nut 102 may be employed with higher weight or higher clamp load applications, including, but not limited to, attaching fascia or bumpers to the frame 106, etc.

Alternatively, the retention clip 100 and the nut 102 may be composed of a polymer-based material, and may be molded, additively manufactured, etc. For example, the retention clip 100 and the nut 102 may be composed of nylon, GMW15702, plastic resins, etc. When the retention clip 100 and the nut 102 are integrally formed from a polymer-based material, the nut 102 may be devoid of threads and the mechanical fastener 122 may be a thread forming screw or a thread forming bolt, for example. In other examples, the retention clip 100 and the nut 102 may be additively manufactured from the polymer-based material, and the nut 102 may be formed with threads for mating with the mechanical fastener 122. Generally, the retention clip 100 and the nut 102 may be composed of the polymer-based material when used in light weight or light clamp load applications, including, but not limited to, interior trim, moldings, wiring, etc.

Figure 3:
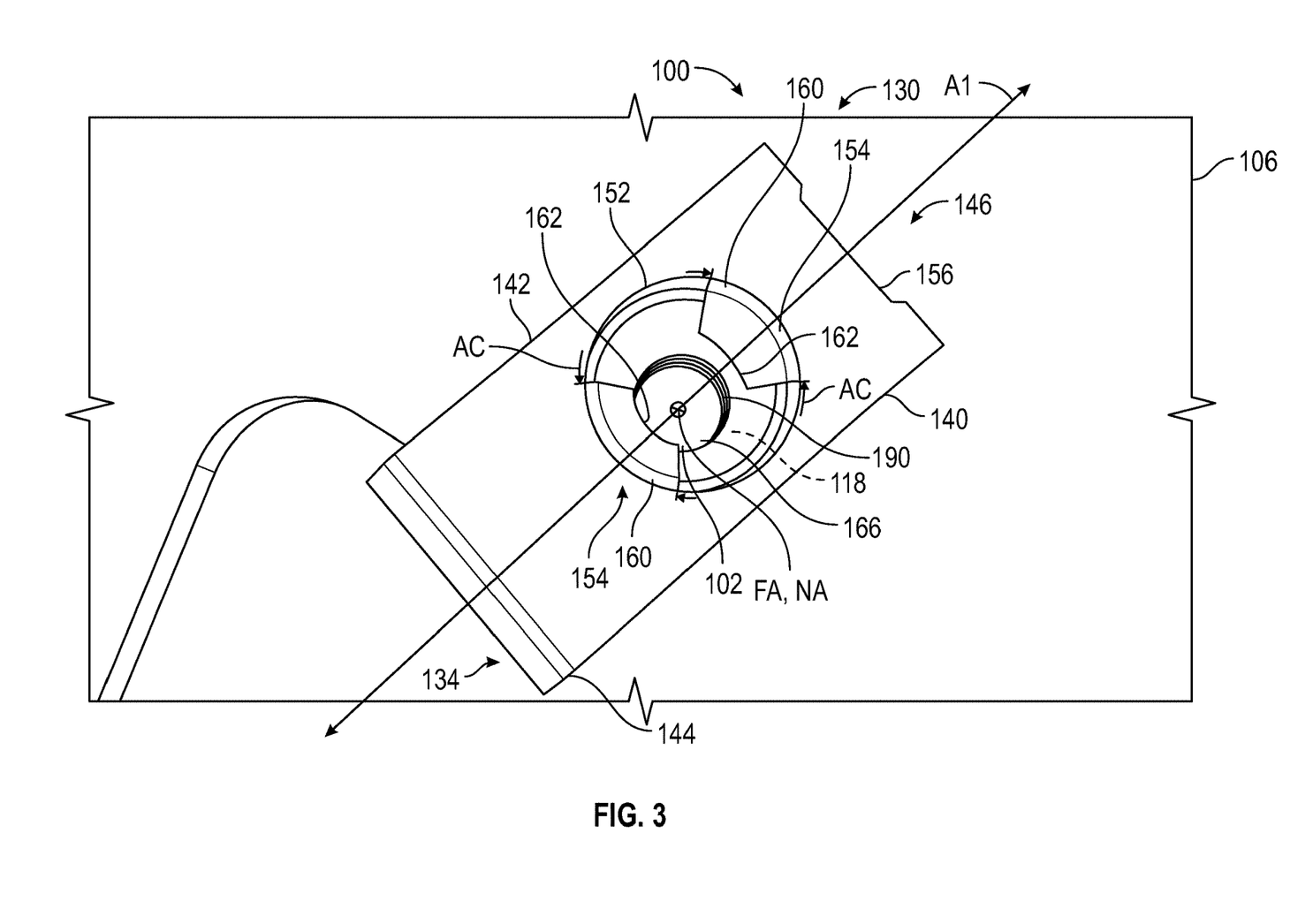
FIG. 3 is a top view of the retention clip with the nut coupled to the frame.

The retention clip 100 includes a first clip arm 130, a second clip arm 132 and an interconnecting arm or bridge 134, which couples the first clip arm 130 to the second clip arm 132. The first clip arm 130 is substantially parallel to and spaced apart from the second clip arm 132. Generally, the first clip arm 130 and the second clip arm 132 each extend parallel to an axis A1, which is substantially perpendicular to a longitudinal axis L1 of the mechanical fastener 122 when the mechanical fastener 122 is coupled to the retention clip 100. The first clip arm 130 includes a first clip side 140 opposite a second clip side 142, a first clip end 144 opposite a second clip end 146, and a first clip surface 148 opposite a second clip surface 150. The first clip arm 130 also defines a fastener bore 152 that includes at least one retention finger 154. The first clip side 140 and the second clip side 142 are each substantially smooth and planar. The first clip end 144 is coupled to or integrally formed with the bridge 134. With reference to FIG. 3, the second clip end 146 includes a cut-out or notch 156. The notch 156 is a recessed area defined in the second clip end 146 between the first clip side 140 and the second clip side 142, which assists in uncoupling or removing the retention clip 100 from the frame 106. In this regard, a fastening tool, such as a flathead screwdriver, may engage the notch 156 and apply a force to uncouple the retention clip 100 from the frame 106. The first clip surface 148 and the second clip surface 150 are each substantially smooth and planar. The second clip surface 150 faces the second clip arm 132, and the first clip surface 148 defines an exterior surface of the retention clip 100.

The fastener bore 152 is defined through the first clip surface 148 and the second clip surface 150 so as to extend through the first clip arm 130. The fastener bore 152 extends along a fastener axis FA, which is substantially parallel and coaxial with the longitudinal axis L1 of the mechanical fastener 122 (FIG. 2), and is substantially perpendicular to the axis A1. The fastener axis FA is substantially parallel to and coaxial with a nut axis NA of the nut 102. The fastener bore 152 is circular, and is sized to receive the mechanical fastener 122.

Figure 4:
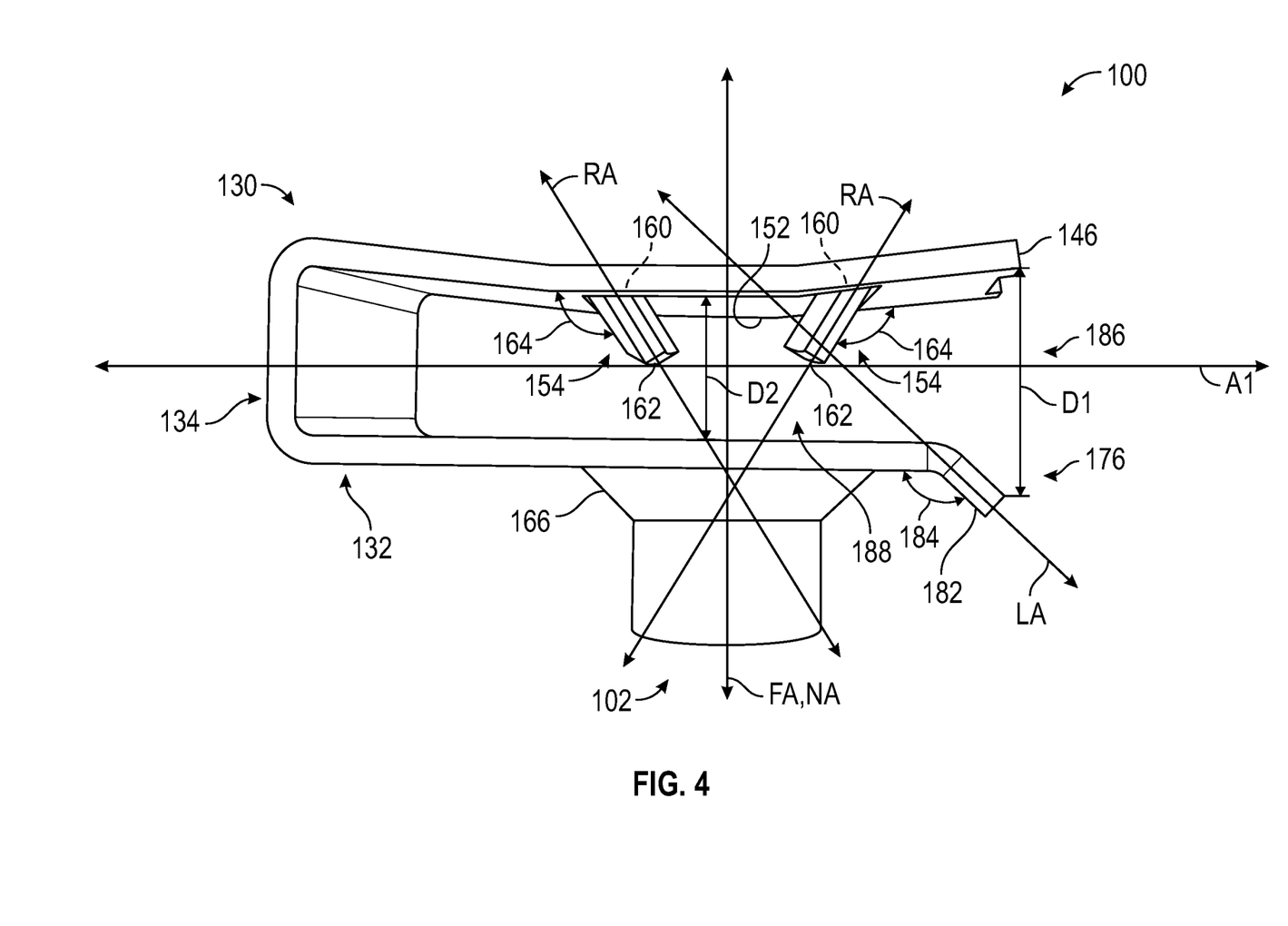
FIG. 4 is a side view of the retention clip with the nut.

In one example, the at least one retention finger 154 includes a plurality of retention fingers 154. In this example, the at least one retention finger 154 comprises two retention fingers 154, but the at least one retention finger 154 may comprise any number of retention fingers, including, but not limited to, one, three, four, six, etc. With reference to FIG. 4, each of the retention fingers 154 extend into the fastener bore 152 in a direction toward the nut 102. Stated another way, the retention fingers 154 extend outwardly from the second clip surface 150 toward the second clip arm 132. Each of the retention fingers 154 include a first finger end 160 opposite a second finger end 162. With reference back to FIG. 3, the first finger end 160 is coupled to a portion of a perimeter or circumference of the fastener bore 152. Each of the retention fingers 154 is cantilevered relative to the fastener bore 152. The first finger end 160 of the retention fingers 154 extends for an arc length AC about the perimeter or circumference of the fastener bore 152. Generally, the combined arc length AC of the retention fingers 154 is different and less than the circumference of the fastener bore 152 such that portions of the fastener bore 152 are devoid of the retention fingers 154. In addition, each of the retention fingers 154 is spaced apart from another one of the retention fingers 154 about the circumference of the fastener bore 152. By spacing the retention fingers 154 about the circumference of the fastener bore 152, it is easier for an operator to insert the mechanical fastener 122 into the fastener bore 152. Generally, the retention fingers 154 enable the mechanical fastener 122 to pass through the fastener bore 152, but interfere with a plurality of threads 192 defined on the mechanical fastener 122 to retain or hold the mechanical fastener 122 on the retention clip 100.

Figure 7:
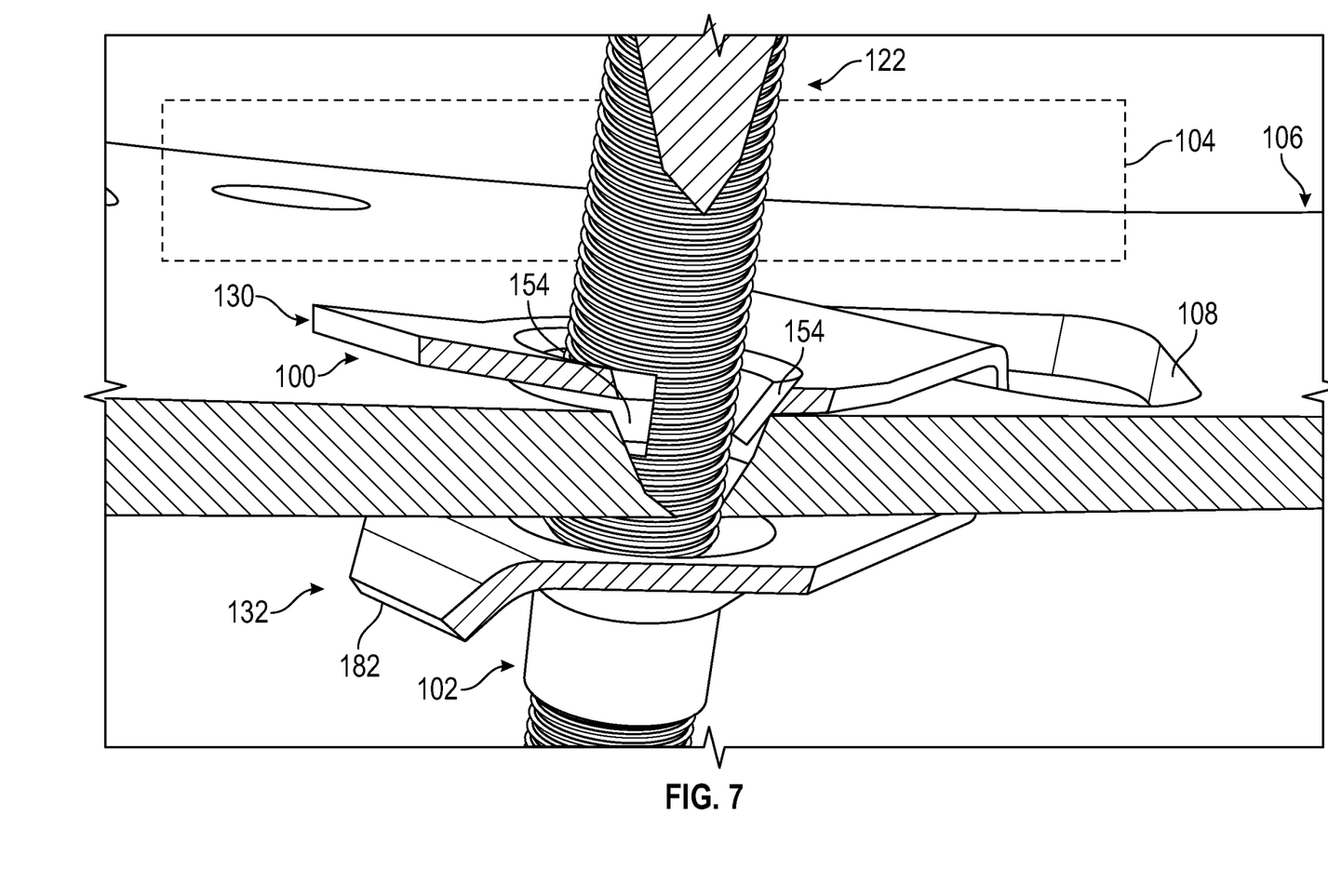
FIG. 7 is a cross-sectional view of the retention clip with the nut coupled to the frame taken along line 7-7 of FIG. 1.

With reference back to FIG. 4, each of the retention fingers 154 extend along a retention axis RA, which is transverse or oblique to the fastener axis FA and the nut axis NA. The retention axis RA is also transverse or oblique to the axis A1 along which the first clip arm 130 extends. In one example, each of the retention fingers 154 extends from the second clip surface 150 at an angle 164, which is defined between the respective retention finger 154 and the second clip surface 150. In this example, the angle 164 is about 45 degrees. The second finger end 162 of each of the retention fingers 154 is a terminal end of the retention finger 154. In one example, each of the retention fingers 154 tapers from the first finger end 160 to the second finger end 162. The retention fingers 154 couple the mechanical fastener 122 to the retention clip 100 without requiring hand-threading. In this regard, as the retention fingers 154 taper from the first finger end 160 to the second finger end 162, and extend along an axis transverse or oblique to the fastener axis FA, the retention fingers 154 cooperate to define an opening 166 for the mechanical fastener 122 that has a perimeter or circumference that is different, and less than the circumference of the fastener bore 152. The size of the perimeter or circumference is also different and less than a diameter of the mechanical fastener 122. The difference in the size of the opening 166 and the diameter of the mechanical fastener 122 retains or couples the mechanical fastener 122 within the opening 166 when the mechanical fastener 122 is coupled to the retention clip 100. In addition, when the mechanical fastener 122 is uncoupled from the retention clip 100, the retention fingers 154 also retain the retention clip 100 within the frame fastener bore 118 of the frame 106 (FIG. 3). The second finger end 162 is in contact with the threads 192 defined on the mechanical fastener 122 to hold the mechanical fastener 122 within the fastener bore 152. The second finger end 162 may include a notch or other feature, if desired, to mate with the diameter of the mechanical fastener 122. Thus, the retention fingers 154 couple the retention clip 100 to the frame 106 by engaging with the frame fastener bore 118, and also couple the mechanical fastener 122 to the retention clip 100 by engaging with the threads 192 defined on the mechanical fastener 122 (FIG. 7).

With reference back to FIG. 2, the second clip arm 132 includes a third clip side 170 opposite a fourth clip side 172, a third clip end 174 opposite a fourth clip end 176, and a third clip surface 178 opposite a fourth clip surface 180. The second clip arm 132 also includes the nut 102. The third clip side 170 and the fourth clip side 172 are each substantially smooth and planar. The third clip end 174 is coupled to or integrally formed with the bridge 134. With reference to FIG. 4, the fourth clip end 176 includes an angled lip 182. The lip 182 assists in coupling the retention clip 100 to the frame 106 (FIG. 1). In one example, the lip 182 extends along a lip axis LA, which is transverse or oblique to the axis A1 of which the second clip arm 132 and the first clip arm 130 extends. The lip axis LA is also transverse or oblique to the nut axis NA. In one example, an angle 184 is defined between the lip 182 and the fourth clip surface 180. The angle 184 is about 45 degrees. By providing the lip 182 at the angle 184, an opening 186 defined between the first clip arm 130 and the second clip arm 132 at the respective second clip end 146 and the fourth clip end 176 is different and larger than an opening 188 defined between the first clip arm 130 and the second clip arm 132 proximate the nut axis NA. Stated another way, a distance D1 between the first clip arm 130 and the second clip arm 132 at the respective second clip end 146 and the fourth clip end 176 is different and greater than a distance D2 defined between the second clip surface 150 of the first clip arm 130 and the fourth clip surface 180 of the second clip arm 132 proximate the nut axis NA. The larger opening 186 enables the retention clip 100 to be easily slid onto the frame 106.

Figure 5:
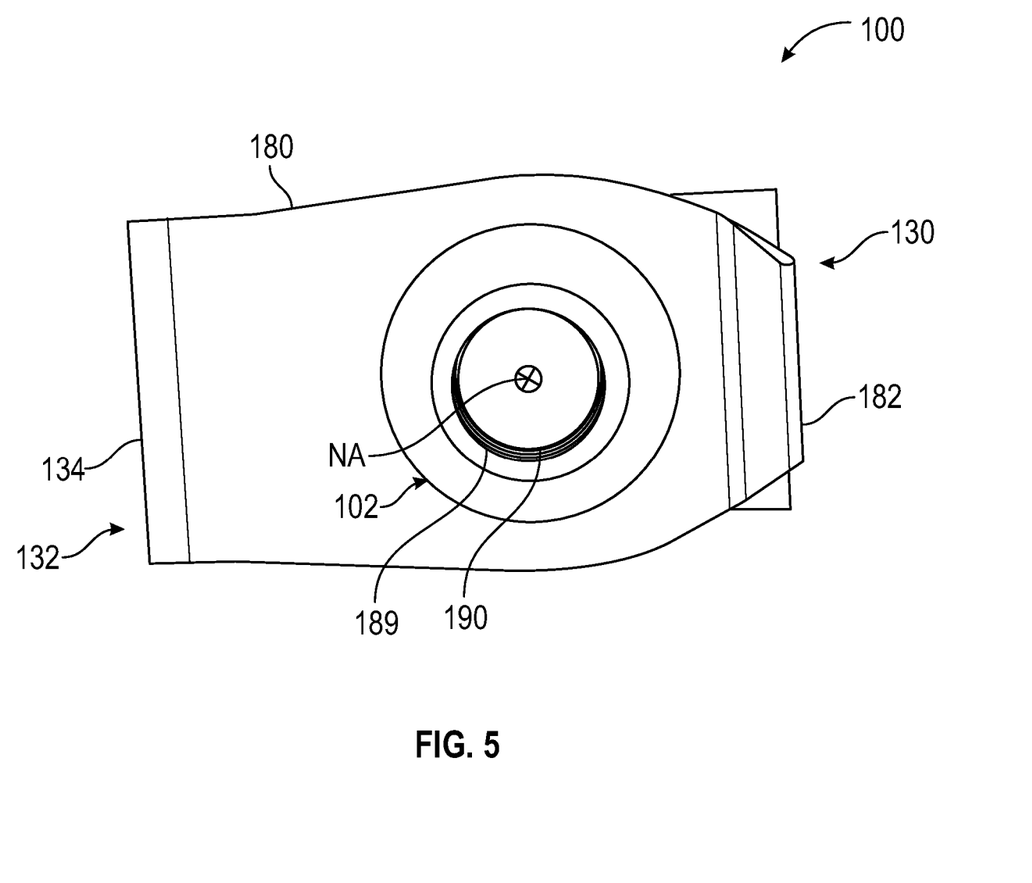
FIG. 5 is a bottom view of the retention clip with the nut.

The third clip surface 178 is substantially smooth and planar. The nut 102 is defined on the fourth clip surface 180. The nut 102 extends outward from the fourth clip surface 180. With reference to FIG. 5, the nut 102 defines a nut bore 189. The nut axis NA is a center axis of the nut bore 189. In the example of the retention clip 100 composed of metal or metal alloy, the nut bore 189 includes a plurality of threads 190. The plurality of threads 190 are defined about an inner perimeter or diameter of the nut bore 189 and engage with a plurality of threads 192 defined on the mechanical fastener 122 to couple the mechanical fastener 122 to the retention clip 100. In the example of the retention clip 100 composed of a polymer-based material, the inner perimeter or diameter of the nut bore 189 may be devoid of the threads 190 or may be smooth, and the mechanical fastener 122 may define threads in the inner perimeter or diameter of the nut bore 189 during engagement of the nut 102 with the mechanical fastener 122. The nut 102 may also define a plurality of flat surfaces about an outer perimeter or circumference of the nut 102, if desired, to provide a location for clamping a tool to assist in coupling or uncoupling the mechanical fastener 122 from the nut 102.

With reference back to FIG. 2, the bridge 134 interconnects the first clip arm 130 with the second clip arm 132. Generally, each of the first clip arm 130 and the second clip arm 132 are cantilevered from or relative to the bridge 134. The bridge 134 has a first bridge end 200 and an opposite second bridge end 202. The first bridge end 200 is coupled to or integrally formed with the first clip arm 130, and the second bridge end 202 is coupled to or integrally formed with the second clip arm 132. In this example, the bridge 134 is solid from the first bridge end 200 to the second bridge end 202, but the bridge 134 may include one or more cut-outs or removed portions, such as a hole, between the first bridge end 200 and the second bridge end 202 to provide a weight savings, for example.

The mechanical fastener 122 couples the component 104 (FIG. 1) to the frame 106, and extends along the fastener axis FA. In one example, the mechanical fastener 122 is, but is not limited to, a bolt, a screw, a thread forming screw or a thread forming bolt. The mechanical fastener 122 includes a head 210 and a shank 212. The head 210 includes a tool engagement surface 214, such as a plurality of flat surfaces, to enable the fastening tool to engage the mechanical fastener 122 to drive the mechanical fastener 122 into engagement with the nut 102. Thus, in certain examples, the head 210 may be a hexagonal head for coupling to a socket of a power drill. The shank 212 extends from the head 210. The shank 212 includes the threads 192. In one example, a majority of the shank 212 is threaded, however, in other examples, the shank 212 may include the threads 192 at a distal end of the shank 212 such that a portion of the shank 212 is threaded. In this example, the threads 192 extend from proximate the head 210 to a distal or terminal end of the shank 212 such that about an entirety of the shank 212 is threaded. The threads 192 engage with the threads 190 of the nut 102 to couple the mechanical fastener 122 to the nut 102 and also engage with the retention fingers 154 of the first clip arm 130 to couple the mechanical fastener 122 to the first clip arm 130 and the retention clip 100. In the example of the retention clip 100 being composed of the polymer-based material, the threads 192 may form threads within the nut 102 and also engage with the retention fingers 154 of the first clip arm 130 to couple the mechanical fastener 122 to the first clip arm 130 and the retention clip 100.

Figure 6:
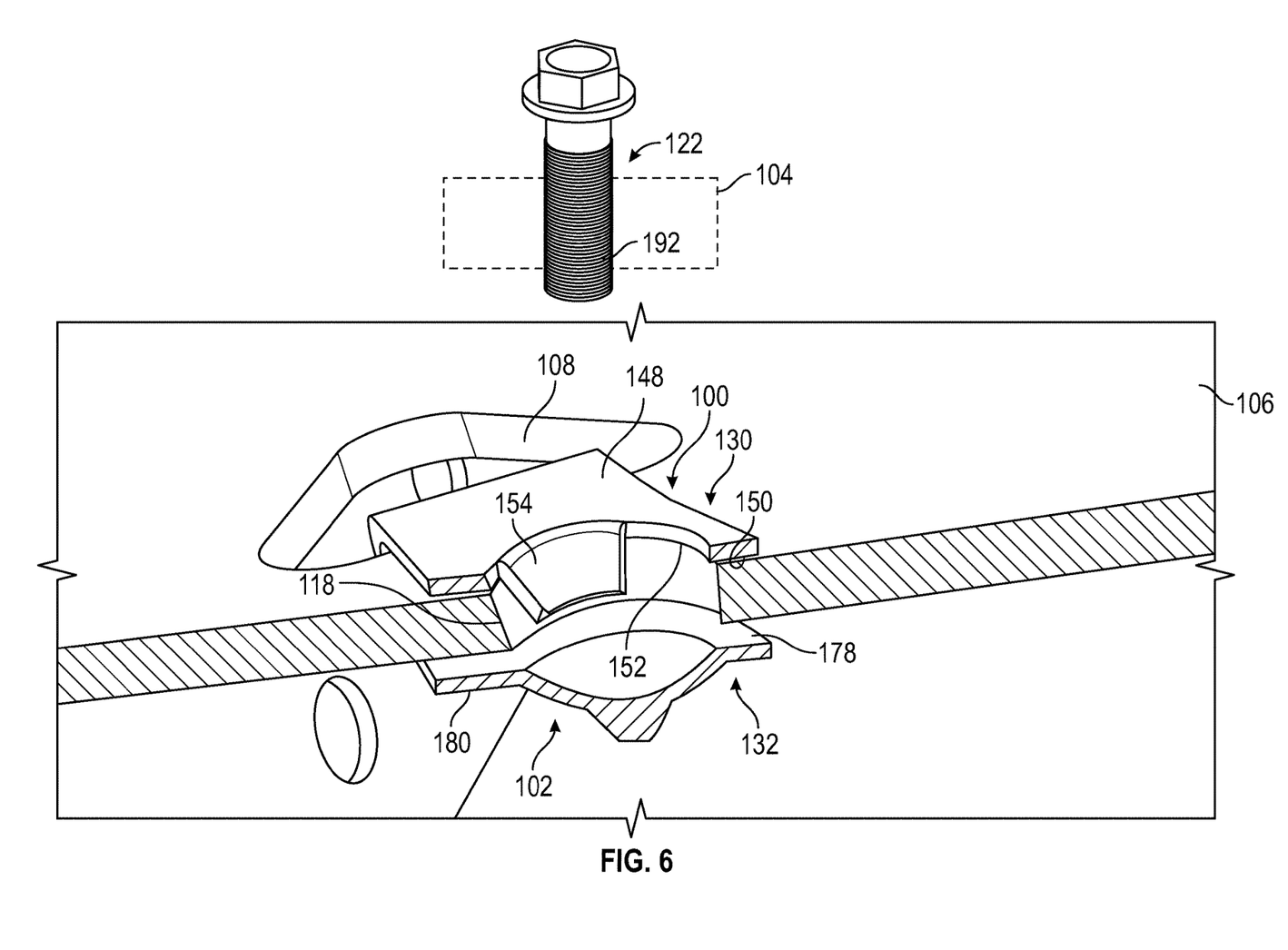
FIG. 6 is a cross-sectional view of the retention clip with the nut coupled to the frame taken along line 6-6 of FIG. 1, in which the mechanical fastener and the component are exploded from the retention clip and the frame.

With the retention clip 100 integrally formed with the nut 102, with reference to FIG. 6, the retention clip 100 is positioned into the opening 108 of the frame 106, and moved or slid until the retention fingers 154 engage with the frame fastener bore 118. The engagement of the retention fingers 154 with the frame fastener bore 118 couples or secures the retention clip 100 on the frame 106. With the retention clip 100 coupled to the frame 106, the operator inserts the mechanical fastener 122 through the component 104. With the mechanical fastener 122 coupled to the component 104, the mechanical fastener 122 is inserted into the retention clip 100. The retention fingers 154 interfere with the threads 192 and hold the mechanical fastener 122 and the component 104 to the frame 106 without requiring hand-threading or hand-tightening of the mechanical fastener 122 by the operator. The operator may simply insert the mechanical fastener 122 into the retention clip 100 and grab the fastening tool. The operator uses the fastening tool to couple the mechanical fastener 122 to the nut 102. With reference to FIG. 7, with the mechanical fastener 122 coupled to the nut 102, the component 104 is secured to the frame 106.

Thus, the retention clip 100 enables the component 104 to be secured to the frame 106 without requiring hand-threading or hand-tightening of the mechanical fastener 122 by the operator. By eliminating the hand-threading or hand-tightening, the operator is able to couple the component 104 to the frame 106 quicker and less space is needed between components as the operator can press the mechanical fastener 122 into the retention clip 100 with one hand. In addition, as the first clip arm 130 and the second clip arm 132 are cantilevered, the operator may push the retention clip 100 into the frame 106 with one hand, and the retention fingers 154 assist in coupling the retention clip 100 to the frame 106. By integrally forming the nut 102 with the retention clip 100, the operator also does not need to use two hands to tighten the mechanical fastener 122 to the retention clip 100.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof.

What is claimed is:

1. A fastener assembly comprising:
a retention clip having:
a first clip arm having a fastener bore formed therethrough and first and second retention fingers spaced apart about a circumferential edge of the fastener bore, each of the first and second retention fingers extending at an oblique angle into the fastener bore and terminating at an end beyond an inner surface of the first clip arm, wherein a combined arc length of the first and second retention fingers about the fastener bore is less than the circumferential edge and the oblique angle is about 45°;
a second clip arm spaced apart from the first clip arm, the second clip arm having a nut with a threaded bore coaxially aligned with the fastener bore; and
a bridge interconnecting the first clip arm and the second clip arm in a spaced relationship such that the inner surface of the first clip arm faces the second clip arm; and
a threaded fastener extending through the fastener bore in the first clip arm and configured to threadably engage the threaded bore in the second clip arm, wherein the ends of the first and second retention fingers form an opening for receiving the threaded fastener therebetween in an axially sliding mode;
wherein the threaded fastener is retained by the first and second retention fingers in the fastener bore of the first clip arm and couples the threaded fastener to the retention clip without requiring hand-threading.

2. The fastener assembly of claim 1, wherein the first clip arm includes a first arm end opposite a second arm end, the second clip arm includes a third arm end opposite a fourth arm end, and the first arm end and the third arm end are coupled together via the bridge.

3. The fastener assembly of claim 2, wherein the fourth arm end includes a lip that extends along a lip axis that is transverse to an axis along which the second clip arm extends.

4. The fastener assembly of claim 2, wherein the second arm end defines a notch configured to receive a fastening tool.

5. The fastener assembly of claim 1, wherein the second clip arm includes a third clip surface opposite a fourth clip surface, each of the first and second retention fingers faces the third clip surface and the nut is defined on the fourth clip surface.

6. The fastener assembly of claim 1, wherein the threaded bore of the nut has a center axis, and the center axis is perpendicular to a longitudinal axis of the second clip arm.

7. The fastener assembly of claim 1, wherein the retention clip is integrally formed.

8. The fastener assembly of claim 7, wherein the retention clip is integrally formed from a polymer-based material.

9. The fastener assembly of claim 1, wherein the first clip arm is spaced apart from the second clip arm to define a gap configured to receive a frame associated with a vehicle, a first clip surface of the first clip arm is configured to contact a component, wherein the retention clip is configured to couple the component to the frame with the threaded fastener.

10. The fastener assembly of claim 1, wherein each of the first and second retention fingers tapers from the fastener bore to the end.

11. A fastener assembly comprising:
    a retention clip having:
        a first clip arm having a fastener bore formed therethrough and a plurality of retention fingers spaced apart about a circumferential edge of the fastener bore, each of the plurality of retention fingers extending at an oblique angle into the fastener bore and terminating at an end beyond an inner surface of the first clip arm, wherein a combined arc length of the plurality of retention fingers about the fastener bore is less than the circumferential edge and the oblique angle is about 45°;
        a second clip arm spaced apart from the first clip arm, the second clip arm having a nut with a threaded bore coaxially aligned with the fastener bore; and
        a bridge interconnecting the first clip arm and the second clip arm in a spaced relationship such that the inner surface of the first clip arm faces the second clip arm; and
    a threaded fastener extending through the fastener bore in the first clip arm and configured to threadably engage the threaded bore in the second clip arm, wherein the ends of the plurality of retention fingers form an opening for receiving the threaded fastener therebetween in an axially sliding mode;
    wherein the threaded fastener is retained by the plurality of retention fingers in fastener bore of the first clip arm and couples the threaded fastener to the retention clip without requiring hand-threading.

12. The fastener assembly of claim 11, wherein the first clip arm includes a first arm end opposite a second arm end, the second clip arm includes a third arm end opposite a fourth arm end, and the first arm end and the third arm end are coupled together via the bridge.

13. The fastener assembly of claim 12, wherein the fourth arm end includes a lip that extends along a lip axis that is transverse to an axis along which the second clip arm extends, and the second arm end defines a notch configured to receive a fastening tool.

14. The fastener assembly of claim 11, wherein the second clip arm includes a third clip surface opposite a fourth clip surface, each of the plurality of retention fingers faces the third clip surface and the nut is defined on the fourth clip surface.

15. The fastener assembly of claim 11, wherein the threaded bore of the nut has a center axis, and the center axis is perpendicular to a longitudinal axis of the second clip arm.

16. The fastener assembly of claim 11, wherein each of the plurality of retention fingers tapers from the fastener bore to the end.

17. The fastener assembly of claim 11, wherein the retention clip is integrally formed.

18. The fastener assembly of claim 17, wherein the retention clip is integrally formed from a polymer-based material.

* * * * *